May 26, 1931.  W. H. SAID  1,807,103
METHOD OF AND MEANS FOR MAKING GLASS ARTICLES
Filed Feb. 21, 1929   2 Sheets-Sheet 1
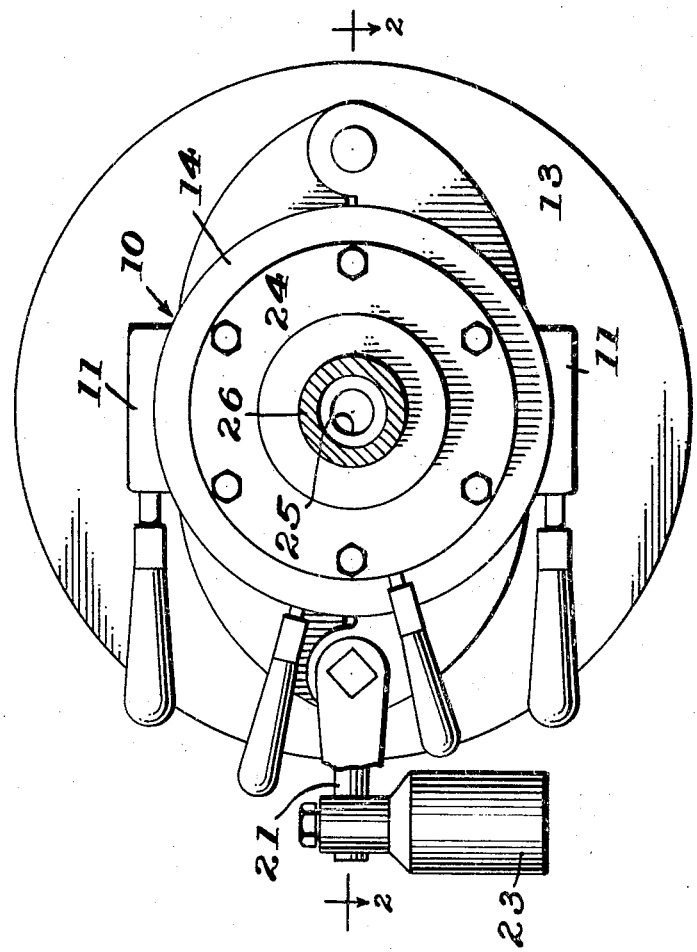
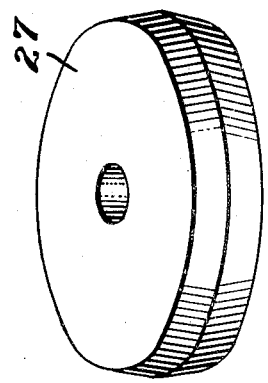
INVENTOR
WILLIAM HOWARD SAID.
BY
ATTORNEYS.

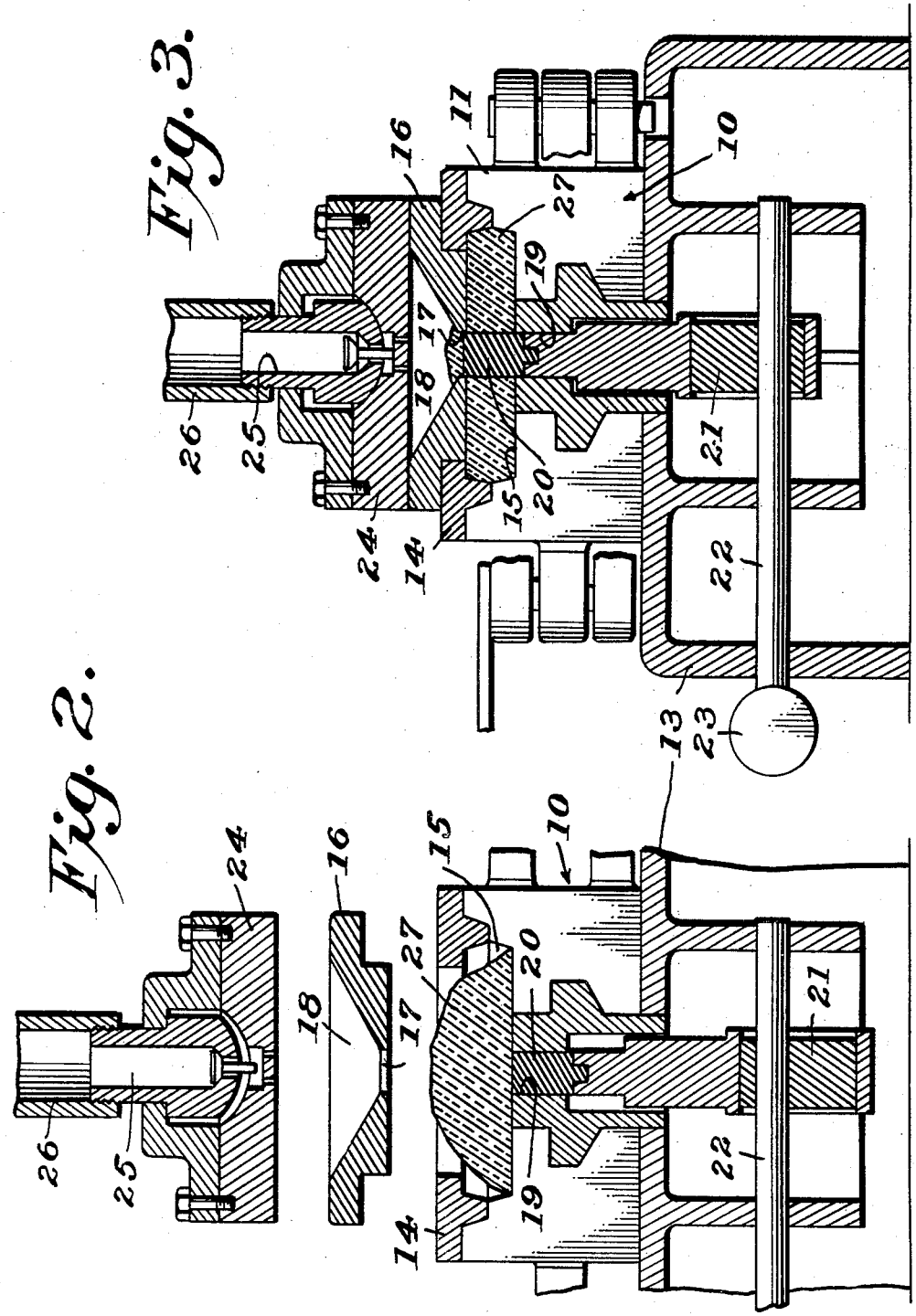

Patented May 26, 1931

1,807,103

UNITED STATES PATENT OFFICE

WILLIAM HOWARD SAID, OF CORNING, NEW YORK, ASSIGNOR TO CORNING GLASS WORKS, OF CORNING, NEW YORK, A CORPORATION OF NEW YORK

METHOD OF AND MEANS FOR MAKING GLASS ARTICLES

Application filed February 21, 1929. Serial No. 341,724.

This invention relates to a method of and means for making glass articles and more particularly to the pressing of completed articles of accurate size and weight. Ordinarily in the production of articles of this nature, it has been the custom to introduce a charge of glass into a mold and then press it into the desired shape. Due to the inability of the operators to secure uniformly accurate delivery of glass to molds, much labor is expended in removing any excess glass from the completed articles so that frequently the finishing of such articles constitutes the larger part of the cost of producing the ware.

The primary object of this invention is to produce articles of uniform size and weight directly from the mold.

Another object is to eliminate the labor and expense incident to the finishing operations ordinarily required.

The above and other objects may be accomplished by the use of my invention which embodies among its features the introduction of molten glass into a mold, the introduction of an apertured glass shaping plunger into the mold, the exertion of fluid pressure on the glass through the aperture in the plunger, and the projecting of a core pin through the mold while the glass is in a molten state so as to cut off and remove any excess glass from the mold and force it against the fluid pressure into a reservoir for receiving it.

In the drawings:

Fig. 1 is a top plan view of a mold such as is used in carrying out this invention;

Fig. 2 is a sectional view taken on the line 2—2 of Fig. 1 showing the plunger and blowhead elevated, and molten glass in the mold, the glass removing core pin being shown in retracted position;

Fig. 3 is a view similar to Fig. 2 showing plunger and blowhead lowered and the glass removing core pin projected; and Fig. 4 is a perspective view of a piece of ware produced by this method.

Referring now to the drawings in detail, the mold body 10 comprises a pair of mold halves 11 and 12 supported on the usual mold bottom 13 and arranged to cooperate with each other and a mold ring 14 in forming a glass shaping mold chamber 15. A plunger 16 is adapted to be seated on the ring 14 as shown in Fig. 2, and is provided with an opening 17 which communicates with an open-ended reservoir 18 for a purpose to be more fully hereinafter described.

Formed in the mold bottom 13 in axial alignment with the opening 17 is an opening 19 which is of a diameter equal to that of the opening 17 and slidably mounted through the opening 19 is a glass removing core pin 20 which is arranged to be moved upwardly at predetermined intervals by any suitable mechanism such as a cam 21. In the present embodiment of this invention, the latter is secured to a horizontally disposed shaft 22 which is rotatably mounted in the mold bottom 13 and is provided with a suitable operating handle 23. It is to be understood however that any other suitable operating means may be used without departing from my invention.

Removably fitted on the upper end of the plunger 16 is a blowhead 24, the latter being provided with a valved passageway 25 for the introduction of fluid under pressure from a fluid supply line 26.

In producing ware in a mold such as above described, a gob of molten glass 27 is introduced into the mold 10, after which the plunger 16 is seated thereon and the glass pressed into shape. The blowhead 24 is then seated on the plunger and pressure admitted from the fluid pressure line 26 into the mold chamber 18 and opening 17. Upon admitting the fluid pressure, the glass removing core pin 20 is moved upwardly through the molten glass within the mold until it enters the opening 17. In this manner, any excess glass is forced out of the mold into the chamber 18 and is completely severed from the glass in the mold. In this way a complete article 27 (Fig. 4) having the desired size and weight is formed. After the article has sufficiently set, the blowhead and plunger are removed and the mold is opened so that the article together with the core pin 20 may be transferred to a leer where the annealing operation takes place. While it is not essential, I have found that by keeping the core pin in the glass during the annealing, the accuracy of the bore formed in the article may be maintained. Since the core pin is formed of a material having a coefficient of expansion greater than glass, it will be obvious that upon cooling, the relative shrinkage of the core pin and article is such that the core pin may be readily withdrawn.

While in the foregoing there has been shown and described the preferred embodiment of this invention it is to be understood that minor changes in the method of procedure and details of construction of the apparatus used may be resorted to without departing from the spirit and scope of the invention as claimed.

What is claimed is:

1. The method of making glass articles which includes pressing molten glass in a mold, exerting fluid pressure on the glass in the mold and ejecting excess glass from the mold against the pressure of the fluid.

2. The method of making glass articles which includes pressing molten glass in a mold, exerting fluid pressure on the glass in the mold, ejecting excess glass from the mold against the pressure of the fluid and severing the excess glass from the article simultaneously with its ejection.

3. The method of making glass articles which includes introducing molten glass into a mold, pressing the glass into shape with an apertured plunger and applying fluid pressure to the glass through the aperture to insure the filling of the mold and yet provide for the accommodation of any glass in excess of that necessary to completely fill the mold.

4. The method of making glass articles which includes introducing molten glass into a mold, pressing the glass into shape with an apertured plunger and applying fluid pressure to the glass through the aperture to insure the filling of the mold and yet provide for the accommodation of any glass in excess of that necessary to completely fill the mold and shearing the excess glass from the article while it is in a plastic condition.

5. A glass shaping apparatus including a mold for receiving molten glass, an apertured plunger cooperating therewith for shaping the glass, means to introduce fluid under pressure through the aperture in the plunger, and a core pin adapted to be moved through the glass to eject excess glass from the mold and into the aperture in the plunger.

6. A glass shaping apparatus including a mold for receiving molten glass, an apertured plunger cooperating therewith for shaping the glass, means to introduce fluid under pressure through the aperture in the plunger, and a core pin adapted to be moved through the glass to eject excess glass from the mold and shear it from the article.

7. A glass shaping apparatus including a mold for receiving molten glass, an apertured plunger cooperating therewith for shaping the glass, means to introduce fluid under pressure through the aperture in the plunger, and a core pin adapted to be moved through the glass to eject glass from the mold and into the aperture in the plunger, said core pin shearing the excess glass from the article by contact with the wall of the aperture.

WILLIAM HOWARD SAID.